United States Patent
Deng et al.

(10) Patent No.: US 10,607,097 B2
(45) Date of Patent: Mar. 31, 2020

(54) METHOD AND DEVICE FOR GUIDING FINGERPRINT RECOGNITION

(71) Applicant: SHENZHEN GOODIX TECHNOLOGY CO., LTD., Shenzhen (CN)

(72) Inventors: Gengchun Deng, Shenzhen (CN); Zhixin Zhong, Shenzhen (CN)

(73) Assignee: Shenzhen Goodix Technology Co., Ltd., Guangdong (CN)

( * ) Notice: Subject to any disclaimer, the term of this patent is extended or adjusted under 35 U.S.C. 154(b) by 0 days.

(21) Appl. No.: 16/133,653

(22) Filed: Sep. 17, 2018

(65) Prior Publication Data
US 2019/0019048 A1  Jan. 17, 2019

Related U.S. Application Data

(63) Continuation of application No. PCT/CN2016/112073, filed on Dec. 26, 2016.

(51) Int. Cl.
| | |
|---|---|
| G06K 9/00 | (2006.01) |
| G06F 3/0481 | (2013.01) |
| G09G 5/00 | (2006.01) |
| G06F 21/32 | (2013.01) |

(Continued)

(52) U.S. Cl.
CPC ......... *G06K 9/00912* (2013.01); *G06F 3/041* (2013.01); *G06F 3/04817* (2013.01); *G06F 21/32* (2013.01); *G06K 9/00013* (2013.01); *G09G 5/003* (2013.01); *H04L 9/3231* (2013.01); *G06F 2203/04803* (2013.01); *G09G 2354/00* (2013.01)

(58) Field of Classification Search
CPC ............. G06F 21/32; G06F 3/041; G06F 2203/04803; G06F 3/04817; G09G 5/003; G09G 2354/00; G06K 9/00013; G06K 9/00912; H04L 9/3231
See application file for complete search history.

(56) References Cited

U.S. PATENT DOCUMENTS

| | | |
|---|---|---|
| 2013/0324089 A1 | 12/2013 | Kim et al. |
| 2014/0292649 A1* | 10/2014 | Bae .......................... G06F 3/01 345/156 |
| 2015/0169163 A1 | 6/2015 | Lee et al. |

(Continued)

OTHER PUBLICATIONS

The extended European Search Report of corresponding European application No. 16925985.0-1218 / 3416050, dated Jul. 19, 2019.

*Primary Examiner* — Muhammad N Edun
(74) *Attorney, Agent, or Firm* — J.C. Patents

(57) ABSTRACT

Provided are a method and a device for guiding fingerprint recognition. The method for guiding fingerprint recognition includes the following steps: determining a current working state of a smart terminal (S1); determining whether a fingerprint input prompting is needed (S2); and if the fingerprint input prompting is needed, displaying a fingerprint input guiding icon within an effective fingerprint detection area of the display (S3); initiating a fingerprint collection function, and collecting fingerprint information within the effective fingerprint detection area (S4). A user is guided to find the location of the fingerprint input quickly by virtue of a fingerprint input guiding icon and improving the efficiency of the fingerprint recognition detection, thereby improving the user experience.

18 Claims, 10 Drawing Sheets

(51) Int. Cl.
*G06F 3/041* (2006.01)
*H04L 9/32* (2006.01)

(56) References Cited

U.S. PATENT DOCUMENTS

| | | |
|---|---|---|
| 2015/0379322 A1* | 12/2015 | Yoon .................... G06F 21/445 |
| | | 382/124 |
| 2016/0283022 A1 | 9/2016 | Yang et al. |
| 2016/0350522 A1 | 12/2016 | Chi et al. |
| 2017/0053149 A1* | 2/2017 | Jiang ..................... G06F 21/32 |

\* cited by examiner

METHOD AND DEVICE FOR GUIDING FINGERPRINT RECOGNITION

CROSS-REFERENCE TO RELATED APPLICATIONS

This application is a continuation of International Application No. PCT/CN2016/112073, filed on Dec. 26, 2016, which is incorporated herein by reference in its entirety.

TECHNICAL FIELD

Embodiments of the present application relate to the technical field of fingerprint detection, and in particular, to a method and a device for guiding fingerprint recognition.

BACKGROUND

Fingerprints, as a unique feature of human body, are characterized in their life-long invariabilities, uniqueness and conveniences. Fingerprint recognition technique is widely exploited in the field of terminals such as smart phones and the like. At present, there are two kinds of fingerprint recognition techniques for a mobile phone. One is to integrate a fingerprint sensor into a button located on the front of mobile phones, thus achieving the fingerprint recognition by sliding or pressing the button; the other is to place a fingerprint sensor on the back of the mobile phone, which allows for the fingerprint recognition with only one independent fingerprint sensor.

However, in the technique where the fingerprint sensor is integrated into the button located on the front of the mobile phone, a frontal area of the mobile phone may be occupied by the button, thereby affecting the screen-to-body ratio and damaging the overall aesthetics; while the technique where the fingerprint sensor is set on the back of the mobile phone is inconvenient in use, resulting in poor user experience.

In view of the above-mentioned problems, researches regarding technical solutions for implementing the fingerprint detection inside a display have been initiated in the industry. Although the above-mentioned problems of the affected screen-to-body ratio due to the fingerprint sensor being integrated into the front button of the mobile phone and the inconvenience in use due to the fingerprint sensor being set on the back of the mobile phone may be solved by exploiting a In-display fingerprint recognition technique, however, since a user cannot accurately perceive the fingerprint detection area, the fingerprint recognition operation of the user and the system fingerprint recognition efficiency may be affected.

SUMMARY

The embodiments of the present application provide a method and device for guiding fingerprint recognition, so as to solve the above-mentioned technical problems.

Firstly, embodiments of the present application provide a method for guiding fingerprint recognition, including: determining a current working state of a smart terminal; determining whether a fingerprint input prompting is needed according to the current working state of the smart terminal; if the fingerprint input prompting is needed, displaying a fingerprint input guiding icon within an effective fingerprint detection area of a display; initiating a fingerprint collection function, and collecting fingerprint information within the effective fingerprint detection area.

As an improvement of the method for guiding fingerprint recognition according to the embodiments of the present application, in an optional implementation, an In-display Middle Ware is provided inside an operating system of the smart terminal, and where the displaying the fingerprint input guiding icon within the effective fingerprint detection area of the display includes: performing, by the In-display Middle Ware, an interactive control with a display driver unit, and driving the display via the display driver unit to display the fingerprint input guiding icon within the effective fingerprint detection area.

As an improvement of the method for guiding fingerprint recognition according to the embodiments of the present application, in an optional implementation, before the smart terminal enters a fingerprint input guiding mode and displays the fingerprint input guiding icon, a fingerprint recognition touch module of the smart terminal is in a sleep mode.

As an improvement of the method for guiding fingerprint recognition according to the embodiments of the present application, in an optional implementation, further including: detecting whether there exists a finger touch operation within the effective fingerprint detection area of the display via a touch module; if there exists the finger touch operation, waking up, by the In-display Middle Ware, the fingerprint recognition module to initiate a fingerprint collection function.

As an improvement of the method for guiding fingerprint recognition according to the embodiments of the present application, in an optional implementation, the current working state of the smart terminal includes a screen-off state, a screen-locked state, or a screen-on state; where the determining whether the fingerprint input prompting is needed according to the current working state includes: when the smart terminal is currently working in the screen-off state or the screen-locked state, it is determined that the fingerprint input prompting is needed; when the smart terminal is currently working in the screen-on state, determining whether there exists a fingerprint verification request initiated by an application to the operating system, if there exists the fingerprint verification request, it is determined that the fingerprint input prompting is needed.

As an improvement of the method for guiding fingerprint recognition according to the embodiments of the present application, in an optional implementation, the operating system of the smart terminal is provided with the In-display Middle Ware, where the when the smart terminal is currently working in the screen-on state, displaying the fingerprint input guiding icon within the effective fingerprint detection area of the display includes: controlling, by the In-display Middle Ware, the smart terminal to enter a fingerprint input guiding mode, and performing an interactive control with the display driver unit to take over at least a part of the display, wherein the part of the display covers the effective fingerprint detection area of the display; driving, by the In-display Middle Ware, the display via the display driver unit to display the fingerprint input guiding icon in the effective fingerprint detection area.

As an improvement of the method for guiding fingerprint recognition according to the embodiments of the present application, in an optional implementation, after entering the fingerprint input guiding mode, the In-display Middle Ware divides the display into a normal display area and a fingerprint input area, wherein the fingerprint input area is an area which is corresponding to the effective fingerprint input area and is taken over by the In-display Middle Ware, and the normal display area is an area other than the fingerprint input area.

As an improvement of the method for guiding fingerprint recognition according to the embodiments of the present application, in an optional implementation, entering the fingerprint input guiding mode, an image content originally displayed in the normal display area of the display is maintained, and an image content originally displayed in the fingerprint input area of the display is hidden or weakened to display the fingerprint input guiding icon.

As an improvement of the method for guiding fingerprint recognition according to the embodiments of the present application, in an optional implementation, after entering the fingerprint input guiding mode, an image content originally displayed in the fingerprint input area of the display is translated to the normal display area to display the fingerprint input guiding icon, and an image content originally displayed in the normal display area is at least partially hidden accordingly.

As an improvement of the method for guiding fingerprint recognition according to the embodiment of the present application, in an optional implementation, after entering the fingerprint input guiding mode, taking over, by the In-display Middle Ware, a display area of the entire display, and weakening or hiding an image content originally displayed on the display to display the fingerprint input guiding icon.

As an improvement of the method for guiding fingerprint recognition according to the embodiments of the present application, in an optional implementation, in the fingerprint input guiding mode, driving, by the In-display Middle Ware, the display via the display driver unit to display an exit button, wherein the exit button is used to provide a user with an operation button to manually control the smart terminal to exit the fingerprint input guiding mode.

As an improvement of the method for guiding fingerprint recognition according to the embodiments of the present application, in an optional implementation, further including: when it is detected that the user performs an exit operation via the exit button or a return key of the smart terminal, returning, by the In-display Middle Ware, a state indicating a cancellation of a fingerprint verification request, and controlling the smart terminal to exit the fingerprint input guiding mode at the same time, and returning a control right of the display back to the application.

Embodiments of the present application further provide a fingerprint recognition and guide device, including an In-display Middle Ware, a display and a fingerprint recognition touch module; the In-display Middle Ware is provided in an operating system of a smart terminal; wherein, the In-display Middle Ware is configured to determine the current working state of the smart terminal, determine whether a fingerprint input prompting is needed according to the current working state of the smart terminal, and control the display to display a fingerprint input guiding icon in an effective fingerprint detection area when the fingerprint input prompt is needed, and initiate a fingerprint collection function of the fingerprint recognition touch module; the fingerprint recognition touch module is configured to collect fingerprint information within the effective fingerprint detection area after the fingerprint collection function is initiated.

As an improvement of the device for guiding fingerprint recognition according to the embodiments of the present application, in an optional implementation, further including a touch module, and before the smart terminal enters the fingerprint input guiding mode, the fingerprint recognition touch module of the smart terminal is in a sleep mode.

As an improvement of the device for guiding fingerprint recognition according to the embodiments of the present application, in an optional implementation, the touch module is configured to detect whether there exists a finger touch operation within the effective fingerprint detection area after entering the fingerprint input guiding mode; and the In-display Middle Ware is further configured to wake up the fingerprint recognition touch module to initiate a fingerprint collection function when the touch module detects the finger touch operation.

As an improvement of the device for guiding fingerprint recognition according to the embodiments of the present application, in an optional implementation, the current working state of the smart terminal includes a screen-off state, a screen-locked state, or a screen-on state; wherein the In-display Middle Ware determines that a fingerprint input prompting is needed when the smart terminal is currently working in the screen-off state or the screen-locked state; and when the smart terminal is currently working in a screen-on state, further determines whether exists a fingerprint verification request initiated by an application to the operating system, if there exists the fingerprint verification request exists, the In-display Middle Ware determines that the fingerprint input prompting is needed.

As an improvement of the device for guiding fingerprint recognition according to the embodiment of the present application, in an optional implementation, when the smart terminal is currently working in the screen-on state, the In-display Middle Ware is further configured to take over at least a part of the display after the smart terminal enters the fingerprint input guiding mode, where the part of the display covers the effective fingerprint detection area of the display.

As an improvement of the device for guiding fingerprint recognition according to the embodiment of the present application, in an optional implementation, the In-display Middle Ware is further configured to divide the display into a normal display area and a fingerprint input area after entering the fingerprint input guiding mode, where the fingerprint input area is an area which is corresponding to the effective fingerprint input area and is taken over by the In-display Middle Ware, and the normal display area is an area other than the fingerprint input area.

As an improvement of the device for guiding fingerprint recognition according to the embodiment of the present application, in an optional implementation, after entering the fingerprint input guiding mode, an image content originally displayed in the normal display area of the display is maintained, and an image content originally displayed in the fingerprint input area is hidden or weakened to display the fingerprint input guiding icon.

As an improvement of the device for guiding fingerprint recognition according to the embodiments of the present application, in an optional implementation, after entering the fingerprint input guiding mode, an image content originally displayed in the fingerprint input area of the display is translated to the normal display area to display the fingerprint input guiding icon, and an image content originally displayed in the normal display area is at least partially hidden accordingly.

As an improvement of the device for guiding fingerprint recognition according to the embodiments of the present application, in an optional implementation, after entering the fingerprint input guiding mode, the In-display Middle Ware takes over a display area of the entire display, and weakens or hides an image content originally displayed on the display to display the fingerprint input guiding icon.

As an improvement of the device for guiding fingerprint recognition according to the embodiments of the present application, in an optional implementation, the In-display Middle Ware is further configured to drive the display via the display driver unit to display an exit button, where the exit button is configured to provide a user with an operation button to manually control the smart terminal to exit the fingerprint input guiding mode.

As an improvement of the device for guiding fingerprint recognition according to the embodiment of the present application, in an optional implementation, the In-display Middle Ware is further configured to, when it is detected that the user performs an exit operation via the exit button or a return key of the smart terminal, return a state indicating a cancellation of a fingerprint verification request, and control the smart terminal to exit the fingerprint input guiding mode at the same time, and return a control right of the display back to the application.

An embodiment of the present application further provides a smart terminal. The smart terminal includes an In-display fingerprint recognition function, and the smart terminal includes a device for guiding fingerprint recognition described above.

Compared with prior art, in the method and device for guiding fingerprint recognition according to the embodiments of the present application, a fingerprint input guiding icon is displayed on the display, which enables the user to perceive the effective fingerprint detection area of the display, thus facilitating the In-display fingerprint recognition input operation of the user on the display, thereby improving the efficiency of the fingerprint recognition detection.

BRIEF DESCRIPTION OF DRAWINGS

For a more clear description of technical solutions of the embodiments of the present application, the necessary drawings used in the embodiments will be briefly described below. It will be apparent that the drawings in the below description are merely some embodiments of the present application. Based on those drawings, those who skilled in the art can also obtain other drawings without any creative work.

DESCRIPTION OF EMBODIMENTS

Figure 1:
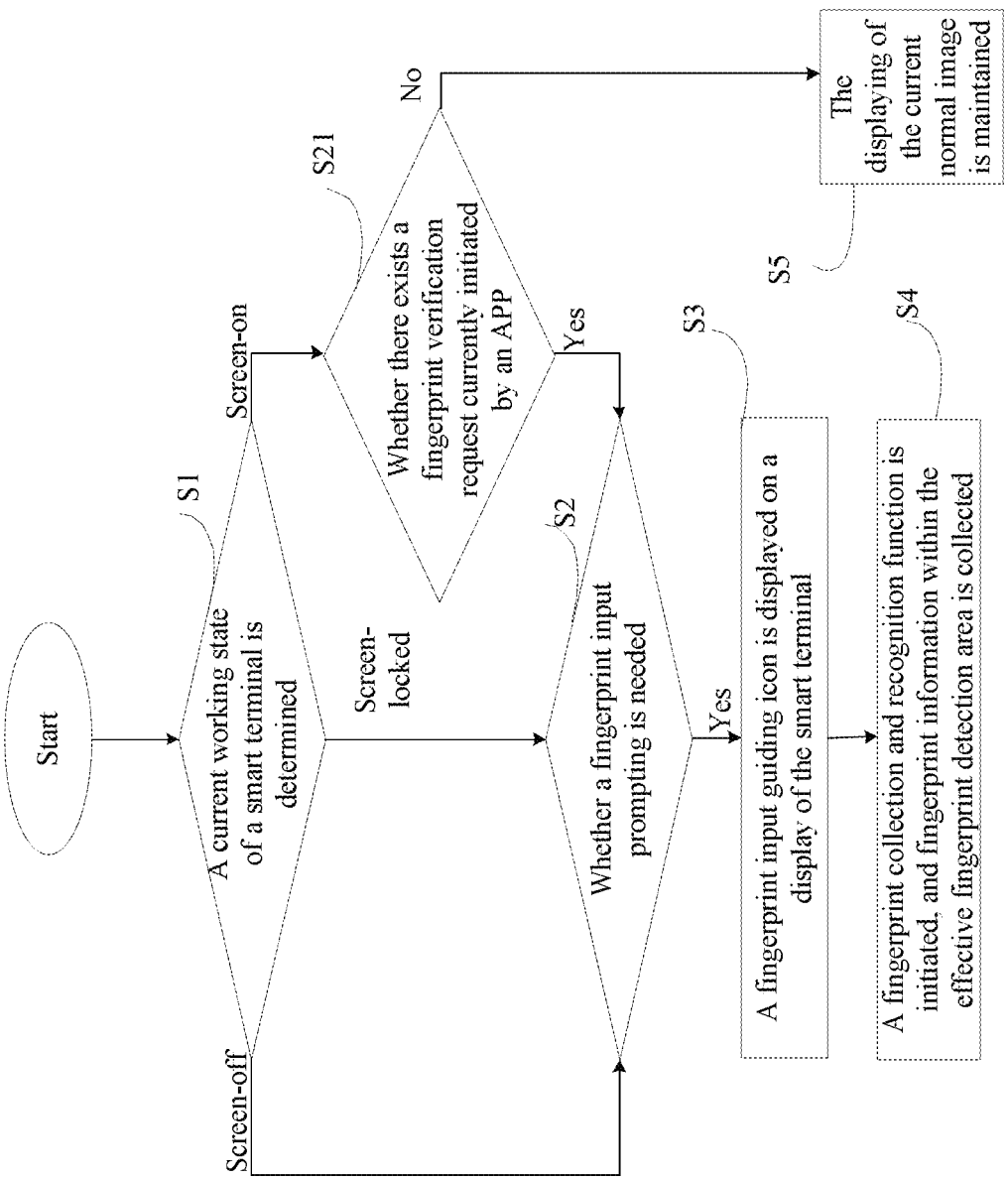
FIG. 1 is a schematic flowchart of a method for guiding fingerprint recognition according to an embodiment of the present application.

For ease of understanding of the present application, the present application will be described more fully hereinafter with reference to the accompanying drawings. The preferred embodiments of the present application are shown in the accompanying drawings. However, the present application can be implemented in many different ways and is not limited to the embodiments described herein. Rather, these embodiments are provided to make the understanding of the disclosure of the present application more thorough and comprehensive.

Unless otherwise defined, all technical and scientific terms used herein are defined as same as the meanings commonly understood by one of ordinary skill in the art to which this application belongs. The terms used herein in the description of this application are merely for the purpose of describing particular embodiments and are not intended to limit the present application.

The method and device for guiding fingerprint recognition provided in the embodiments of the present application may be applied to smart terminal devices with In-display Middle Ware recognition functions, such as smart phones, tablet computers, laptops, e-books, personal digital assistants or other electronic devices with displays. The display of the smart terminal device may include an organic light-emitting diode (OLED) display apparatus, a liquid crystal display (LCD) apparatus, or other types of panel display apparatuses. In a specific embodiment, the display may be a touch display with both touch detection and display functions. A touch module configured for touch detection and a display module configured for image display may be combined or integrated in a manner such as in-cell, on-cell, OGS or the like, which will not be limited by the embodiments of the present application.

The fingerprint recognition function of the smart terminal device may be implemented by a fingerprint recognition module including a fingerprint sensor. The fingerprint sensor may be a capacitive fingerprint sensor, an optical fingerprint sensor, an ultrasonic fingerprint sensor, or other types of fingerprint sensors. In a specific embodiment, the fingerprint sensor may be partially or entirely disposed in a specific area in the lower part of the display, partially or entirely embedded into the display, or integrated into the display or disposed adjacent to the display in other manners. Besides, an effective fingerprint detection area of the fingerprint sensor is located in at least a part of the display. The display may be used as a fingerprint detection interface for the fingerprint recognition module. For example, a user may press his finger on the display or slide on the display to enable a fingerprint input operation. The fingerprint sensor detects fingerprint information (such as a fingerprint pattern or fingerprint data) about the finger via a capacitor detection, ultrasonic detection, or optical detection, thus realizing a fingerprint recognition operation based on the display, which is also referred to as an In-display fingerprint recognition operation.

It should be understood that although the above-mentioned In-display fingerprint recognition scheme makes it possible to implement a full-screen fingerprint recognition function in a smart terminal device, in some application scenarios, the fingerprint sensor may only be set in a partial area of the display, or the effective fingerprint detection area of the fingerprint sensor covers only a part of the display. In this case, the user of the smart terminal device himself/herself cannot perceive the effective fingerprint detection area of the display, and if the area of the display on which the user's finger presses or slides is deviated from the effective fingerprint detection area when the user performs a fingerprint recognition operation, the fingerprint sensor may fail to detect the user's fingerprint information in a normal way, the user may thus need to try multiple times in the fingerprint recognition area, which not only affects the fingerprint detection efficiency of the smart terminal device, but also reduces user experience.

To solve the above-mentioned problem, embodiments of the present application provide a method and device for guiding fingerprint recognition applicable to a smart terminal device adopting an In-display Middle Ware recognition scheme, by controlling the display to display a fingerprint input guiding icon in the effective fingerprint detection area thereof in a screen-off state, a screen-locked state or a screen-on state of the smart terminal, prompt the user of the fingerprint recognition input area of the display, thereby facilitating the In-display fingerprint recognition operation of the user.

Referring to FIG. 1, which is a schematic flowchart of a method for guiding fingerprint recognition according to an embodiment of the present application. The method for guiding fingerprint recognition includes:

Step S1: a current working state of a smart terminal is determined,

The current working state of the smart terminal may specifically include a state of a display of the smart terminal, including a screen-off state, a screen-locked state, or a screen-on state. The screen-off state refers to that the display of the smart terminal is not currently illuminated and is in an extinguished state. For example, the screen-off state may be a standby state. At this point, some internal functional modules of the smart terminal may be in a sleep mode. The screen-locked state refers to that the display of the smart terminal is currently illuminated but in a locked state, and a user can only perform a touch input operation after unlocking the display. The screen-on state refers to that the display of the smart terminal is currently illuminated and has been unlocked to enter a normal working state, and the user can directly perform an input operation via the display; it should be understood that there may be certain applications (APPs) running in the screen-on state of the smart terminal and one of the APPs may currently control the display to display corresponding application contents.

Step S2: whether a fingerprint input prompting is needed is determined according to the current working state of the smart terminal, if so, proceed to step S3.

Specifically, if in step S1, it is detected that the smart terminal is currently in the screen-off or screen-locked state, the user may need to activate or unlock the smart terminal to start some application functions via a fingerprint input operation at any time, in this case, it can be determined that the fingerprint input prompting is currently required for the smart terminal, and proceed to step S3.

If in step S1, it is detected that the smart terminal is currently in a screen-on state, it is then required to further determine (step S21) whether there exists a fingerprint verification request currently initiated by an APP to an operating system (OS); if no above-mentioned fingerprint authentication request exits, it means that the smart terminal is currently in the normal working state and a normal image is currently displaying on the display. Therefore, it can be determined that no fingerprint input prompting is currently required on the display so as to prevent the displaying of the current normal image from being affected. In the case, the method proceeds to step S5, and the displaying of the current normal image is maintained.

In contrast, if there exists a fingerprint verification request currently initiated by an APP to the operating system (for example, a fingerprint verification request for a mobile payment initiated by a payment APP), it means that a fingerprint input operation of the user is currently required to verify that the user is authorized to use the corresponding function of the APP. Therefore, at this time, it can be determined that the fingerprint input prompting is needed on the display, and proceed to step S3.

Step S3: a fingerprint input guiding icon is displayed within an effective fingerprint detection area of a display of the smart terminal.

Where the fingerprint input guiding icon is used to indicate the effective fingerprint detection area of the display. Specifically, when it is determined in step S2 that the fingerprint input prompting is needed according to the current working state of the smart terminal, the display may be controlled to display a fingerprint input guiding icon in its effective fingerprint detection area to guide the user to perform a fingerprint input operation such as pressing or sliding within the effective fingerprint detection area of the display. The specific shape, pattern, color, or style of the fingerprint input guiding icon may be preset based on actual needs, or may be customized by the user based on personal preferences, which will not be limited by the embodiment of the present application.

Step S4: a fingerprint collection and recognition function is initiated, and fingerprint information within the effective fingerprint detection area is collected.

According to the fingerprint input guiding icon displayed on the display, the user may perform an In-display fingerprint input operation via the display within the effective fingerprint detection area indicated by the fingerprint input guiding icon. It can be understood that when the user performs an In-display fingerprint input operation, firstly the user needs to touch the display with a finger, and at this point, the touch of the user's finger (e.g. the action of pressing with the finger) on the display may be detected by the touch module of the smart terminal. In addition, when the touch of the user's finger within the effective fingerprint detection area of the display is detected, the smart terminal may initiate its fingerprint collection function and collect the fingerprint information of the user within the effective fingerprint detection area via the fingerprint recognition module, and the smart terminal may perform corresponding fingerprint recognition, verification, and other processing on the fingerprint information of the user.

As a specific embodiment, in step S3, via an In-display Middle Ware provided in the operating system, the smart terminal may implement interactive controls of a touch panel driver (TP Driver) unit, a display driver (DP Driver) unit and a fingerprint driver (FP Driver) unit and further control the display driver unit to drive the display module to display the fingerprint input guiding icon.

Figure 2:
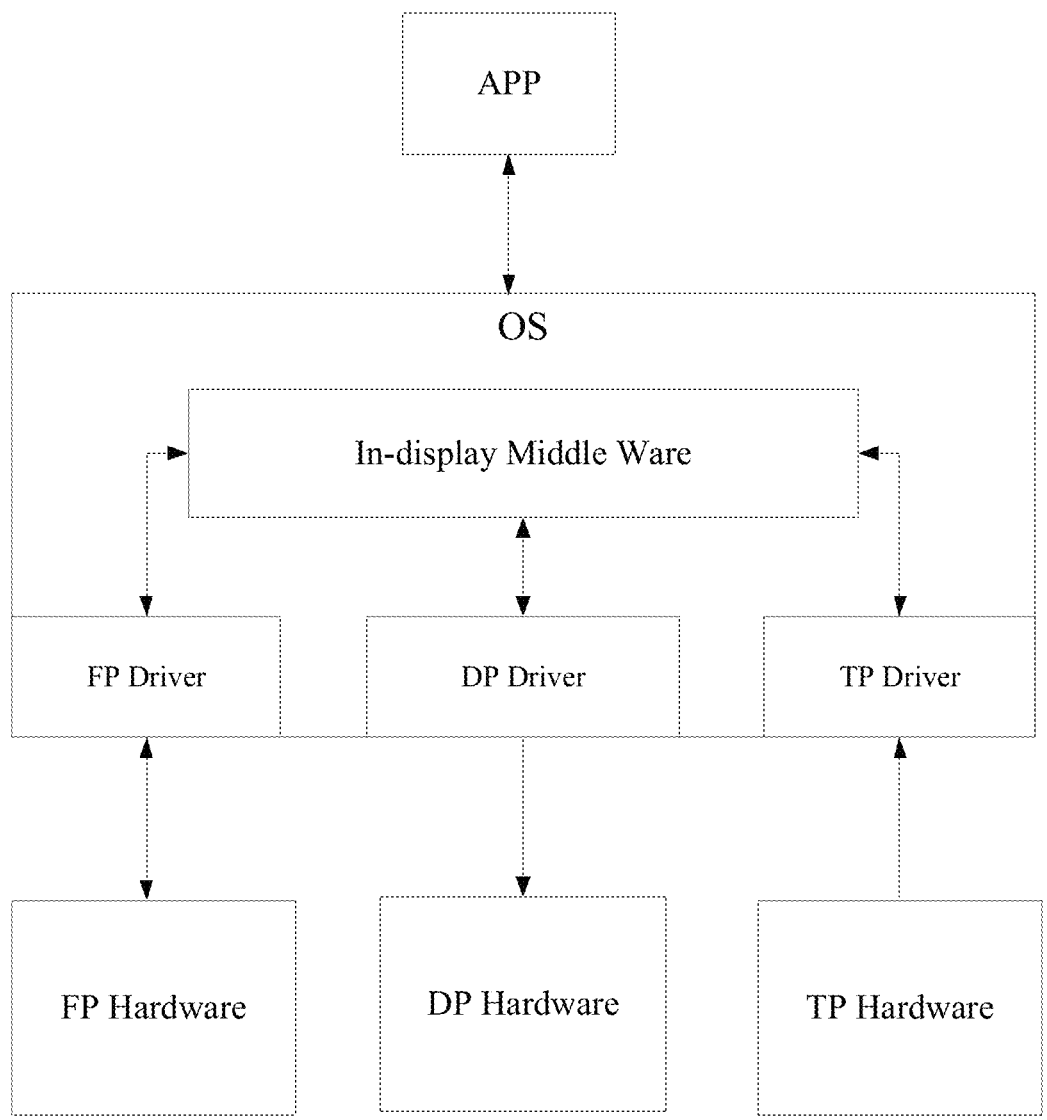
FIG. 2 is a schematic diagram of functional modules of a smart terminal to which the method for guiding fingerprint recognition in the present application can be applied.

For example, refer to FIG. 2, which is a schematic diagram of functional modules of a smart terminal to which the method for guiding fingerprint recognition in the present application can be applied. As shown in FIG. 2, the operating system (OS) of the smart terminal includes an In-display Middle Ware, a touch panel driver (TP Driver) unit, a display driver (DP Driver) unit, and a fingerprint driver (FP Driver) unit, where the In-display Middle Ware can respectively perform a touch panel drive interactive control with the TP Driver unit, and perform a display drive interactive control with the DP Driver unit, and perform a fingerprint recognition drive interactive control with the FP Driver unit. Moreover, the operating system may also interact with an APP, such as receiving a request from the APP and return a corresponding result to the APP; specifically, the operating system may forward a request initiated by the APP related to the fingerprint recognition verification to the In-display Middle Ware, and return a feedback result related to the fingerprint recognition verification provided by the In-display Middle Ware to the APP.

The TP Driver unit, the DP Driver unit and the FP Driver unit of the operating system are respectively connected to the touch module, the display module and the fingerprint recognition module, so as to drive the touch module, the display module and the fingerprint recognition module to perform corresponding touch detection, image display, and fingerprint detection functions, where the touch module may specifically refer to a touch panel hardware (TP Hardware), for example, including a touch panel and a corresponding touch panel drive hardware circuit; the display module may specifically refer to display hardware (DP Hardware), for example, including a display and a corresponding display drive hardware circuit; the fingerprint recognition module may be specifically refer to a fingerprint hardware (FP Hardware), for example, including a fingerprint sensor and a corresponding peripheral circuit or auxiliary circuit.

In the embodiments of the present application, by providing the operating system with the In-display Middle Ware and controlling the DP Driver unit via the In-display Middle Ware to drive the display to display the fingerprint input guiding icon, thereby in one aspect, the fingerprint input guiding icon can be displayed on the display in the screen-off state or the screen-locked state, and in the other aspect, the fingerprint input guiding icon can be displayed by performing the display drive control via the In-display Middle Ware when the APP initiates a fingerprint verification request in the screen-on state, rather than controlling the display module via the APP, thus improving the compatibility of the smart terminal with respect to an APP, and at the same time, no interference or other affects would be caused to the currently normally displayed image when the fingerprint input guiding icon is displayed in the screen-on state.

In addition, in step S4, when the touch module detects that the user's finger touches the effective fingerprint detection area of the display, a detection result may be reported to the In-display Middle Ware via the TP Driver unit; further, the In-display Middle Ware wakes up the fingerprint recognition module via the FP Driver unit, and uses the fingerprint recognition module to collect the fingerprint information within the effective fingerprint detection area of the display. In addition, via the recognition, analysis and verification of the above-mentioned fingerprint information, it can be determined whether the user currently performing the fingerprint input operation is an authorized user.

For a better understanding of the method for guiding fingerprint recognition in the embodiments of the present application, with reference to specific scenarios in which the smart terminal works in different states such as a screen-off state, a screen-locked state, and a screen-on state, the principle of how an In-display fingerprint recognition operation is realized in the method for guiding fingerprint recognition according to the embodiments of the present application by virtue of the displaying of a fingerprint input guiding icon on a display will be described in the following.

(I) Method for Guiding Fingerprint Recognition in the Screen-off State

Figure 3:
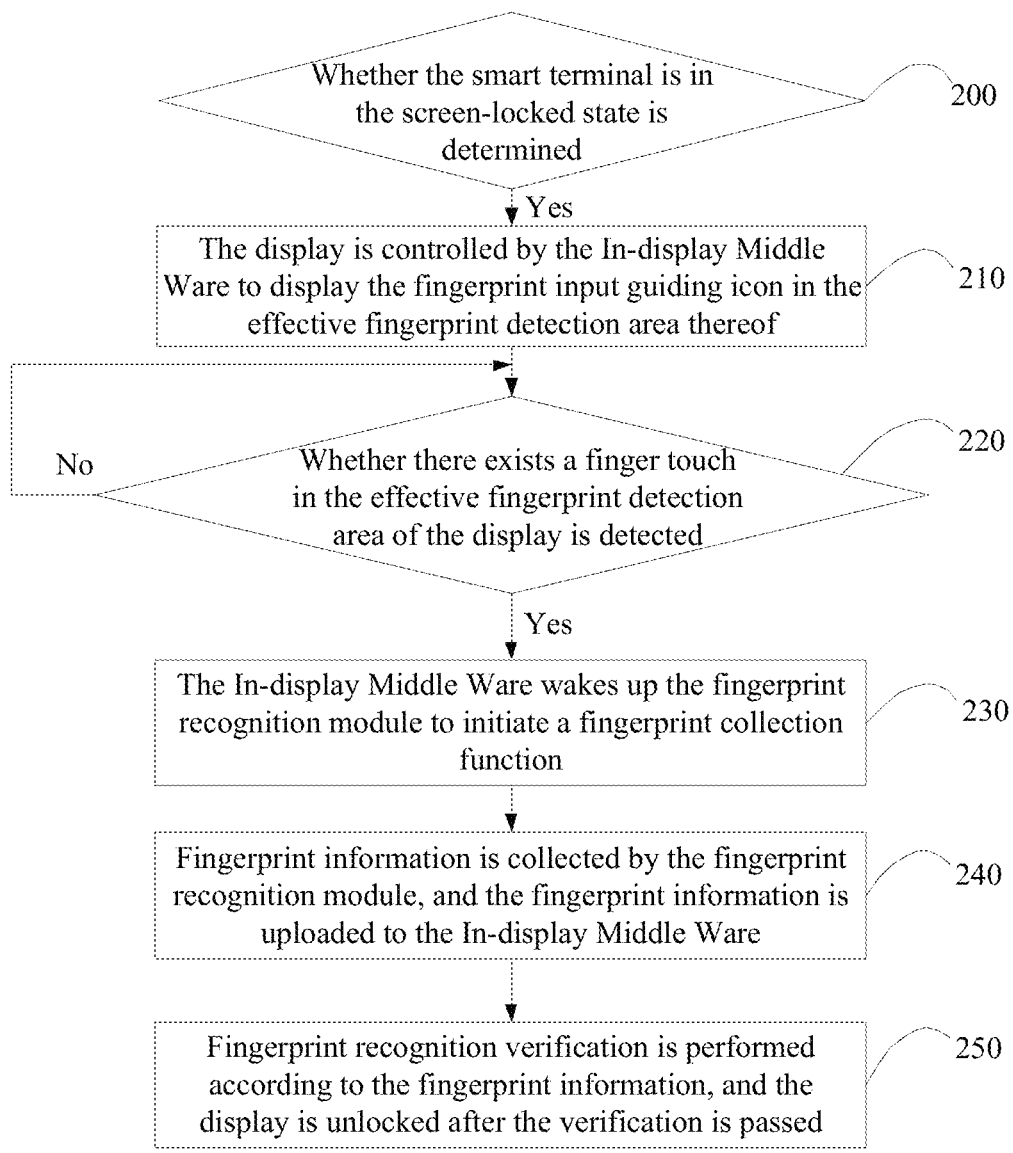
FIG. 3 is a flowchart of a method for guiding fingerprint recognition in a screen-off state according to a first embodiment of the present application.

Please refer to FIG. 3, which is a flowchart of a method for guiding fingerprint recognition in a screen-off state according to a first embodiment of the present application. The method for guiding fingerprint recognition according to the first embodiment of the present application includes the following steps:

Step 100: whether a smart terminal is in the screen-off state is determined, if the smart terminal is in the screen-off state, perform step 110.

In step 100, when the smart terminal is in the screen-off state, a fingerprint recognition module of the smart terminal is in a sleep mode, a touch module and a display module of the smart terminal are both in working states; where the touch module being in the working state means that it can detect and respond to the touch action (such as an ordinary touch operation or a pressing operation) applied to the display of the smart terminal in the screen screen-off state, which can specifically be in a low-power consumption touch detection state or be in a normal-power consumption touch detection state or in other states where the touch operation can be detected. In the screen-off state, although the fingerprint recognition module is in the sleep mode, on considering that the user may need to perform activation and unlock operations of the smart terminal via fingerprint input verifications at any time, so when the smart terminal is determined to be in the screen-off state, the smart terminal can be controlled to enter a fingerprint input guiding mode by the In-display Middle Ware in the operating system (OS) of the smart terminal.

Step 110: the display is controlled by an In-display Middle Ware to display the fingerprint input guiding icon within an effective fingerprint detection area.

As described above, when the smart terminal is in the screen-off state, the In-display Middle Ware controls the smart terminal to enter the fingerprint input guiding mode by default. After entering the fingerprint input guiding mode, the In-display Middle Ware may perform an interactive control with the DP Driver unit of the operating system, and drive the display module via the DP Driver unit to display the fingerprint input guiding icon in the effective fingerprint detection area of the display, so as to guide the user to intuitively learn about the effective fingerprint detection area of the display when the user needs to activate and unlock the smart terminal, thereby facilitating the fingerprint input operation and allowing for quick fingerprint unlocking.

Figure 4:
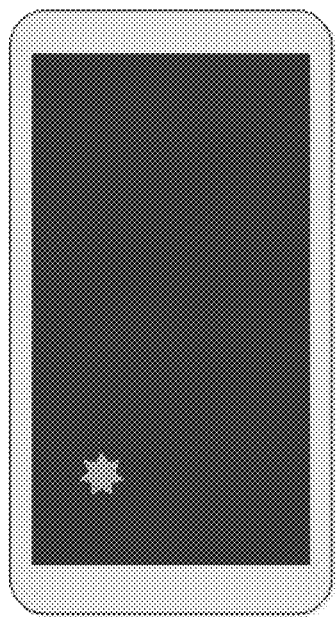
FIG. 4 is a schematic diagram of a fingerprint input guiding icon for the method for guiding fingerprint recognition in the screen-off state shown in FIG. 3 of the present application.

Referring to FIG. 4, for example, assuming that the fingerprint sensor of the smart terminal is set in a partial area of the display, such as a lower left corner area, and the effective fingerprint detection area of the display at this time is limited to the lower left corner area of the display, therefore, the In-display Middle Ware may control the FP drive unit to drive the display module to display a fingerprint input guiding icon in the lower left corner area of the display. In a specific embodiment, the specific shape, pattern, color, or style of the fingerprint input guiding icon may be preset according to actual needs, or may be customized by the user in advance according to personal preference, which will not be limited by the embodiments of the present application. In the example shown in FIG. 4, the fingerprint input guiding icon of the present application is a six-pointed star icon.

Step 120: whether there exists a finger touch in the effective fingerprint detection area of the display is detected, if so, perform step 130; otherwise, continue to perform step 120.

Figure 5:
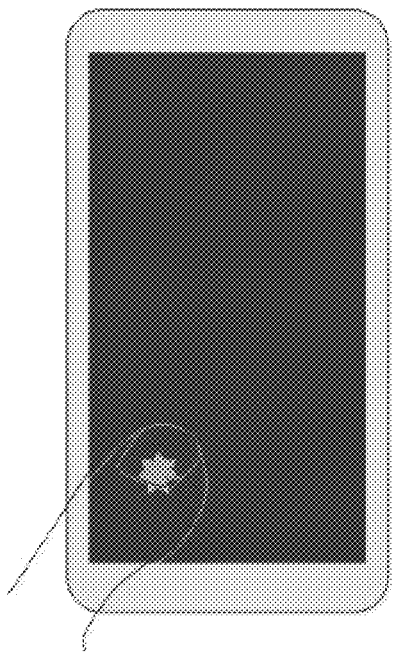
FIG. 5 is a schematic diagram of a pressing-type fingerprint input operation performed on the fingerprint input guiding icon shown in FIG. 4 of the present application.

Specifically, according to the fingerprint input guiding icon displayed on the display, the user can learn about the effective fingerprint detection area of the display, and perform a fingerprint input operation of pressing or sliding-type or other types with his/her finger on the effective fingerprint detection area of the display when needing to activate and unlock the smart terminal. The pressing-type is taken as an example in this embodiment for illustration, as shown in FIG. 5. The user's finger is needed to touch the effective fingerprint detection area of the display no matter whether the fingerprint input operation is of the pressing-type or sliding-type; therefore, in step 120, the touch module may detect whether there exists a finger touch in the effective fingerprint detection area of the display, so as to determine whether a finger is currently performing a fingerprint input operation within the effective fingerprint detection area of the display; where the finger touch may be either an ordinary touch operation or a pressing operation. In addition, the touch module may report the detection result to the In-display Middle Ware via the TP Driver unit of the operating system when detecting that there exists a finger touch in the effective fingerprint detection area of the display.

Although the embodiment mainly described in the present application takes a pressing-type fingerprint input operation as an example, it should be understood that in other alternative embodiments, if the fingerprint recognition module uses a sliding-type fingerprint sensor, the user may also perform a sliding-type fingerprint input operation in the effective fingerprint detection area. Whether it is a pressing-type fingerprint input operation or a sliding type fingerprint input operation, the user needs to touch the display with his/her finger in both situations, as such, a touch detection operation may be preformed within the effective fingerprint detection area of the display by the touch module of the smart terminal to determine whether there exists a fingerprint input operation from a user.

Step 130: the In-display Middle Ware wakes up the fingerprint recognition module to initiate a fingerprint collection function.

As described above, in the screen-off state of the smart terminal, the fingerprint recognition module is in the sleep mode, so it needs to be woken up to initiate the fingerprint collection function of the smart terminal. In step 130, when the In-display Middle Ware learns that there exists a finger touch in the effective fingerprint detection area of the display from the detection result reported by the touch module, it may perform an interactive control with the FP Driver unit of the operating system and wake up the fingerprint recognition module via the FP Driver unit so as to initiate the fingerprint collection function of the fingerprint recognition module.

Step 140: fingerprint information is collected by the fingerprint recognition module, and the fingerprint information is uploaded to the In-display Middle Ware.

Specifically, after being woken up, the fingerprint recognition module may collect the fingerprint information of the finger that is performing the fingerprint input operation within the effective fingerprint detection area of the display, thereby the fingerprint information of the user's finger is obtained, and the fingerprint information is returned to the FP Driver unit. The FP Driver unit further uploads the fingerprint information to the In-display Middle Ware.

Step 150: fingerprint recognition verification is performed according to the fingerprint information, the display is illuminated and an unlock processing is performed after the verification is passed.

Specifically, after receiving the fingerprint information uploaded by the fingerprint recognition module, the In-display Middle Ware may perform the fingerprint recognition verification according to the fingerprint information, so as to determine whether the currently collected fingerprint information is matched to that of an authorized user; if so, the user currently performing the fingerprint input operation is determined to be an authorized user, and the fingerprint recognition verification is passed, and at this time, the operating system may control the smart terminal to exit the screen-off state and illuminate the display, meanwhile, the screen of the smart terminal is unlocked.

In step 150, after the unlocking is completed, the In-display Middle Ware may further control the smart terminal to exit the fingerprint input guiding mode.

In the above embodiment, after collecting the fingerprint information of the finger, the fingerprint recognition module directly uploads the collected fingerprint information to the In-display Middle Ware, and the In-display Middle Ware performs the fingerprint recognition verification on the fingerprint information. Alternatively, in another embodiment, the fingerprint recognition module may also be configured with a fingerprint recognition function. In this case, the fingerprint recognition module may perform the fingerprint recognition processing after collecting the fingerprint information and upload the fingerprint recognition result to the fingerprint recognition guide middle ware.

(II) Method for Guiding Fingerprint Recognition in the Screen-locked State

Figure 6:
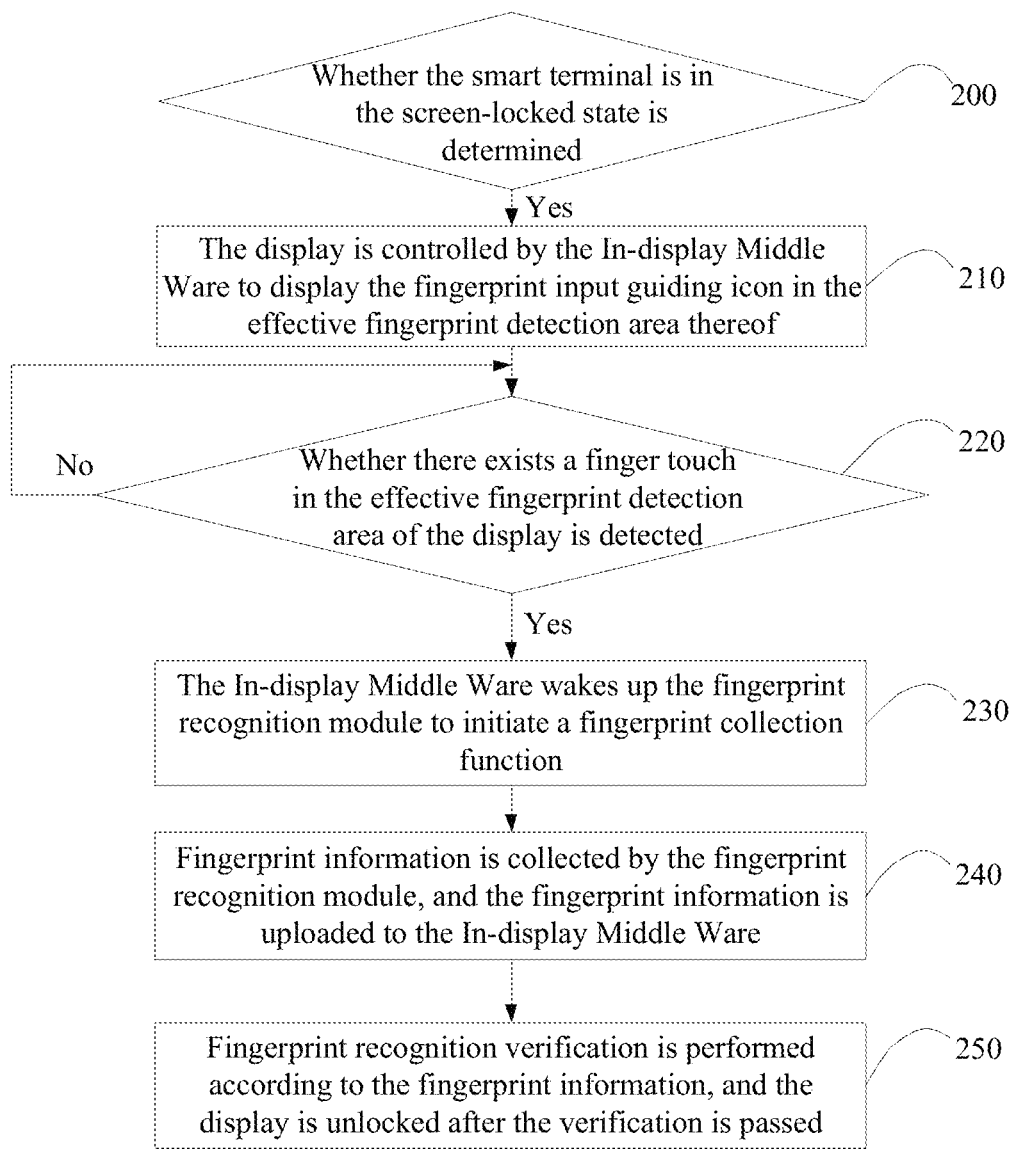
FIG. 6 is a flowchart of a method for guiding fingerprint recognition in a screen-locked state according to a second embodiment of the present application.

Please refer to FIG. 6, which is a flowchart of a method for guiding fingerprint recognition in a screen-locked state according to a second embodiment of the present application. The method for guiding fingerprint recognition according to the second embodiment of the present application includes the following steps:

Step 200: whether the smart terminal is in the screen-locked state is determined. If the smart terminal is in the screen-locked state, perform step 210.

In step 200, when the smart terminal is in the screen-locked state, the fingerprint recognition module of the smart terminal is in the sleep mode, while the touch module and the display module of the smart terminal are both in the working states, at this time, the display of the smart terminal is illuminated but locked. Similar to the previous embodiment, where the touch module being in the working state means that the touch module can detect and respond to the touch action (such as an ordinary touch operation or a pressing operation) applied to the display of the smart terminal in the screen-locked state, which can specifically be in the low-power consumption touch detection state or in the normal power touch detection state or in other states where the touch operation can be detected. When it is determined that the smart terminal is currently in the screen-locked state, the In-display Middle Ware of the OS may control the smart terminal to enter the fingerprint input guiding mode.

Step 210: the display is controlled by the In-display Middle Ware to display the fingerprint input guiding icon in the effective fingerprint detection area thereof.

Figure 7:
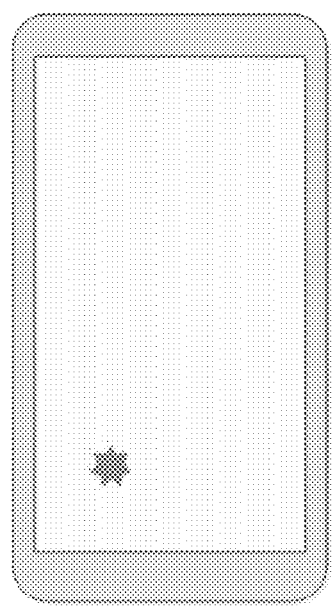
FIG. 7 is a schematic diagram of a fingerprint input guiding icon for the method for guiding fingerprint recognition in the screen-locked state shown in FIG. 6 of the present application.

As described above, when it is determined that the smart terminal is in the screen-locked state, the In-display Middle Ware may control the smart terminal to enter the fingerprint input guiding mode by default. After entering the fingerprint input guiding mode, the In-display Middle Ware may perform an interactive control with the DP Driver unit of the OS and drive the display module via the DP Driver unit to display the fingerprint input guiding icon within the effective fingerprint detection area of the display. As shown in FIG. 7, the fingerprint input guiding icon may facilitate the user to perform the fingerprint input operation within the effective fingerprint detection area, thus allowing for quick fingerprint unlocking.

Figure 8:
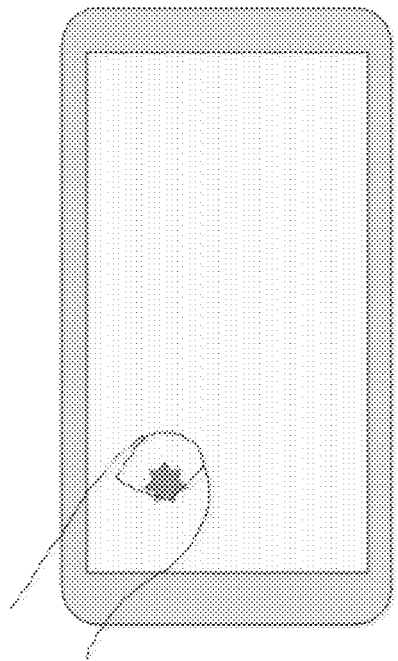
FIG. 8 is a schematic diagram of a pressing-type fingerprint input operation performed on the fingerprint input guiding icon shown in FIG. 7 of the present application.

Step 220: whether there exists a finger touch in the effective fingerprint detection area of the display is detected, if so, perform step 230; otherwise, continue to perform step 220;

Specifically, according to the fingerprint input guiding icon displayed on the display, the user can perform a fingerprint input operation with his/her finger within the effective fingerprint detection area of the display, as shown in FIG. 8. Therefore, in step 220, the touch module may detect whether there exists a finger touch in the effective fingerprint detection area of the display, and report the detection result to the In-display Middle Ware via the TP Driver unit of the OS when detecting that there exists a finger touch in the effective fingerprint detection area of the display.

Step 230: the In-display Middle Ware wakes up the fingerprint recognition module to initiate a fingerprint collection function.

In step 230, when the In-display Middle Ware learns that there exists a finger touch in the effective fingerprint detection area of the display from the detection result reported by the touch module, the In-display Middle Ware may perform an interactive control with the FP Driver unit of the OS, and wake up the fingerprint recognition module via the FP Driver unit, thereby initiating the fingerprint collection function of the smart terminal.

Step 240: fingerprint information is collected by the fingerprint recognition module, and the fingerprint information is uploaded to the In-display Middle Ware.

Specifically, after being woken up, the fingerprint recognition module may collect the fingerprint information of the finger that is performing the fingerprint input operation within the effective fingerprint detection area of the display, and upload the fingerprint information to the In-display Middle Ware via the FP Driver unit of the OS.

Step 250: fingerprint recognition verification is performed according to the fingerprint information, and the display is unlocked after the verification is passed.

Specifically, the In-display Middle Ware may perform the fingerprint recognition verification according to the fingerprint information reported by the fingerprint recognition module. If the fingerprint recognition verification is passed, the user currently performing the fingerprint input operation is determined to be an authorized user. The OS may control the smart terminal to exit the screen-locked state and unlock the display.

In step 250, after the unlocking is completed, the In-display fingerprint recognition guide middle ware may further control the smart terminal to exit the fingerprint input guiding mode.

(III) Method for Guiding Fingerprint Recognition in the Screen-on State

Figure 9:
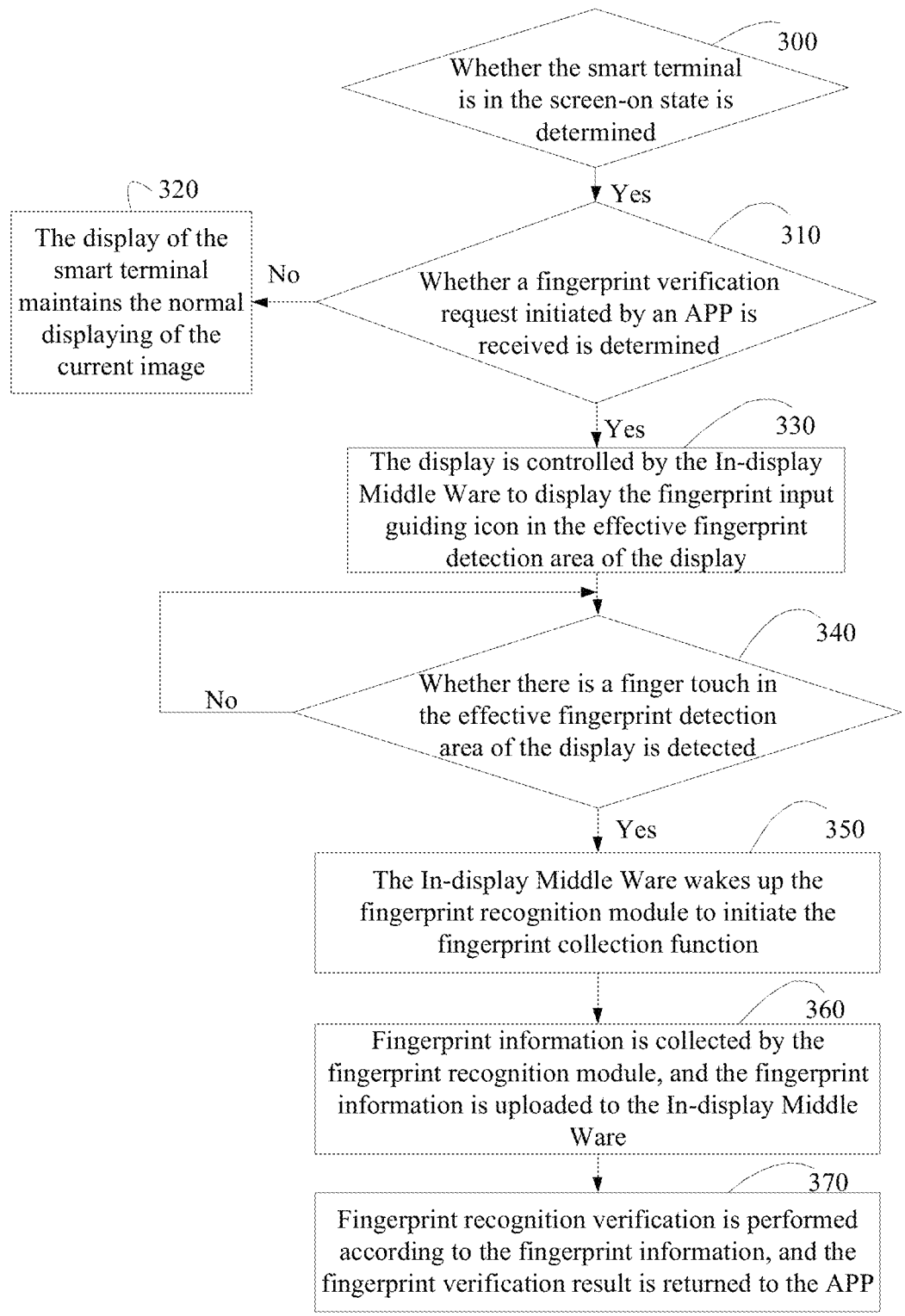
FIG. 9 is a flowchart of a method for guiding fingerprint recognition in a screen-on state according to a third embodiment of the present application.

Please refer to FIG. 9, which is a flowchart of a method for guiding fingerprint recognition in a screen-on state according to a third embodiment of the present application. The method for guiding fingerprint recognition according to the third embodiment of the present application includes the following steps:

Step 300: whether the smart terminal is in the screen-on state is determined. If the smart terminal is in the screen-on state, perform step 310.

When the smart terminal is in the screen-on state, its display module and touch module are both in the working states. At this time, the display of the smart terminal displays a normal image. For example, when the smart terminal is running an APP in the screen-on state, the APP may control the display to display an APP page related to the APP. In addition, the user may perform a touch input operation on the display, and the touch module may detect and respond to the touch input operation (such as an ordinary touch operation or a pressing operation) applied to the display of the smart terminal.

In the screen-on state, in order to prevent the fingerprint input guiding icon from causing interference or other influences onto the normal image currently displayed, generally, no fingerprint input guiding icon is displayed on the display of the smart terminal. Moreover, since the user may need to perform a touch input operation at an arbitrary position anywhere on the display at this time, in the screen-on state, the OS of the smart terminal may control the fingerprint recognition module to stay in the sleep mode, as such, even when the user presses an area where the fingerprint sensor is located with his/her finger (or the effective fingerprint detection area), no fingerprint input will be generated.

Step 310: whether a fingerprint verification request initiated by an APP is received is determined; if not, perform step 320; if the fingerprint verification request is received, perform step 330;

Specifically, when the smart terminal is in the screen-on state, the current running APP may require the user to verify whether he/she is authorized to use the corresponding function of the APP via the fingerprint input, for example, when a payment APP of the smart terminal initiates a mobile payment function, a fingerprint input verification for the user is needed to determine whether the above-mentioned mobile payment function can be executed; in this case, the APP will initiate a fingerprint verification request to the OS of the smart terminal.

After the OS receives the fingerprint verification request initiated by the APP, it may forward the fingerprint verification request to the In-display Middle Ware. Therefore, the In-display Middle Ware may determine whether the fingerprint verification request initiated by the APP is received. If the fingerprint verification request sent by the APP is not received, the method may proceed to step 320; if the fingerprint verification request sent by the APP is received, the method proceeds to step 330.

Step 320: the display of the smart terminal maintains the normal displaying of the current image.

Figure 10:
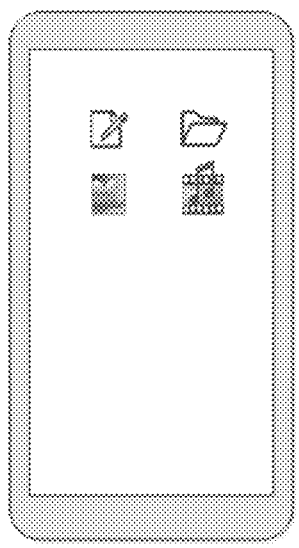
FIG. 10 is a schematic diagram of an image displayed on a display of an smart terminal of the present application in a normal screen-on working state.

If in step 310, the In-display Middle Ware determines that no fingerprint verification request initiated by a certain APP is received, it means that the user is not required to perform any fingerprint input operation at present. Therefore, the In-display Middle Ware may drive the display via the DP Driver unit to maintain the current normal image displaying, as shown in FIG. 10, that is, no fingerprint input guiding icon is displayed within the effective fingerprint detection area of the display to prevent the fingerprint input guiding icon from causing interference onto the normal image currently displayed. In addition, the In-display Middle Ware may maintain the fingerprint recognition module in a sleep state by performing the interactive control with the FP Driver unit of the OS, thereby preventing the generation of an unnecessary fingerprint input when the user performs a touch operation within the effective fingerprint detection area of the display.

In step 320, when the smart terminal is in a normal working state (that is, the current APP does not initiate a fingerprint verification request), the In-display Middle Ware can drive the fingerprint recognition module via the FP Driver unit to maintain the sleep state, thereby reducing the power consumption of the fingerprint module, and effectively reducing the overall system power consumption of the smart terminal.

Step 330: the display is controlled by the In-display Middle Ware to display the fingerprint input guiding icon in the effective fingerprint detection area of the display.

Figure 11:
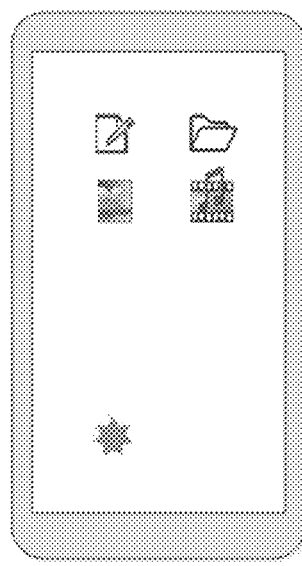
FIG. 11 is a schematic diagram of a fingerprint input guiding icon for the method for guiding fingerprint recognition in the screen-on state shown in FIG. 9.

In step 330, when it is determined that a certain APP currently needs to initiate a fingerprint verification and thus initiates a fingerprint verification request to the OS, the OS may forward the fingerprint verification request to the In-display Middle Ware after receiving the fingerprint verification request, and the In-display Middle Ware may control the smart terminal to enter a fingerprint input guiding mode according to the fingerprint verification request. In addition, the In-display Middle Ware may perform an interactive control with the DP Driver unit of the OS, and drive the display module via the DP Driver unit to display the fingerprint input guiding icon within the effective fingerprint detection area of the display, as shown in FIG. 11, so as to guide the user to intuitively learn about the effective fingerprint detection area of the display during the fingerprint input operation, thereby facilitating quick fingerprint verification.

It should be understood that in specific implementation, although the In-display Middle Ware may control the display to display the fingerprint input guiding icon within the effective fingerprint detection area directly, if a part of the display content in the current image displayed on the display is located within the effective fingerprint detection area, the fingerprint input guiding icon may overlap with the display content in the above-mentioned effective fingerprint detection area and cause interference, thereby affecting the display effect, or even leading to a situation where the fingerprint input guiding icon cannot be normally displayed; in order to solve the above-mentioned problem, the embodiments of the present application provide several optional solutions, which will be illustrated in the following examples.

Figure 12:
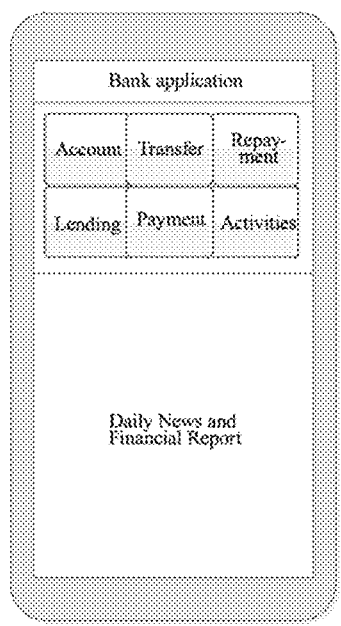
FIG. 12 is a schematic diagram of a smart terminal running an application and displaying a corresponding application page on a display.

Assuming that a certain banking APP currently running in the system controls the display to display an APP page of the banking APP, as shown in FIG. 12, the display page of the banking APP includes operation buttons (operation buttons such as "Account", "Transfer", "Repayment", "Lending", "Payment", "Activities" etc. as shown in FIG. 12) located in an upper half of the display and information content ("Daily News and Financial Report" as shown in FIG. 12) located in the lower half of the display. In the following example, it is assumed that the effective fingerprint detection area of the display is located in a lower half of the display, that is to say, a part of the content currently displayed on the lower half of the display (i.e., "Daily News Finance Report") is located within the effective fingerprint detection area. When the banking APP requires to perform the mobile payment function, it may initiate a fingerprint verification request to the OS of the smart terminal. After receiving the fingerprint verification request forwarded by the OS, the In-display Middle Ware may control the smart terminal to enter the fingerprint input guiding mode.

Figure 13:
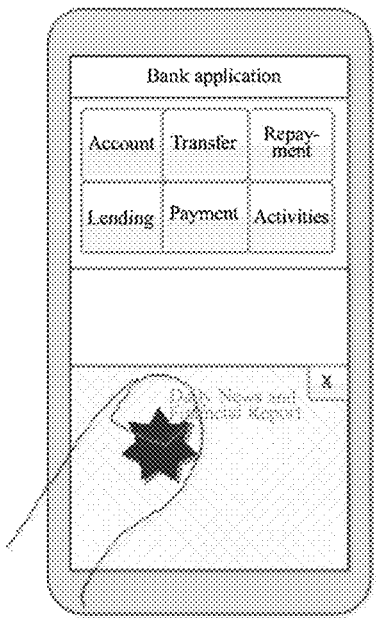
FIG. 13 is a schematic diagram of displaying a fingerprint input guiding icon on the application page shown in FIG. 12 according to an optional implementation of the method for guiding fingerprint recognition of the present application in the screen-on state.

Referring to FIG. 13, it is an optional implementation, where after the smart terminal enters the fingerprint input guiding mode, the In-display Middle Ware may take over a part of the display by performing an interactive control with the DP Driver unit. The part of the display, which is illustrated in FIG. 13 as a shaded area, specifically covers at least the effective fingerprint detection area of the display. In addition, the part of the display that is taken over by the In-display Middle Ware displays the fingerprint input guiding icon under the control of the In-display Middle Ware, and the part of the display that is not taken over by the In-display Middle Ware still maintains the normal display, that is, displaying the original APP content of the banking APP (such as the above-mentioned operation buttons of the banking APP).

Specifically, in the fingerprint input guiding mode, the In-display Middle Ware divides the display of the smart terminal into two areas, one of which is configured as a normal display area maintaining normally displayed image content; optionally, at this time, the normal display area can still respond to the touch input operation of the user normally, that is, the TP Driver unit of the OS drives the touch module to maintain the touch detection and response function of the normal display area; Alternatively, the In-display Middle Ware may also pause the touch detection and response function of the normal display area by performing an interactive control with the TP Driver unit, that is, even when the user performs a touch operation in the normal display area, no response will be made by the system with respect to the touch operation at this time.

Another area of the display is configured as a fingerprint input area corresponding to the effective fingerprint input area, for example, the fingerprint sensor is located in the fingerprint input area; and the In-display Middle Ware controls the display state of the fingerprint input area by performing interactions with the DP Driver unit. Specifically, as shown in FIG. 13, the In-display Middle Ware may control the original display content (such as contents related to the above-mentioned "Daily News Finance Report") in the fingerprint input area to be hidden or weakened via the DP Driver unit, and control the display module via the DP Driver unit to display the fingerprint input guiding icon in the fingerprint input area.

In an optional embodiment, as shown in FIG. 13, the In-display Middle Ware may control the DP Driver unit to add a fingerprint input guiding layer to the layer of the originally normally displayed image in the fingerprint input area (shown as a shaded portion of FIG. 13), and the fingerprint input guiding icon is displayed on the fingerprint input guiding layer. And the TP Driver unit may drive the touch module to maintain the touch detection function of the fingerprint input area.

On the other hand, in the fingerprint input guiding mode, in order to facilitate an exit operation of the user, optionally, during the period when taking over the fingerprint input area, the In-display Middle Ware may also drive the display via the DP drive unit to display an exit button in an edge area of the fingerprint input area (such as a corner area) or other areas of the fingerprint input area. The drive unit drives the display to display an exit button, as shown in FIG. 13 with an "X" mark. The user can exit the fingerprint input guiding mode by virtue of the exit button. When the touch module detects that the user is performing an exit operation via the exit button of the fingerprint input area, it can report the exit operation of the user to the In-display Middle Ware via the touch drive unit. The In-display Middle Ware may return a state indicating a cancellation of a fingerprint verification request to the APP based on the exit operation of the user, and simultaneously control the OS to exit the fingerprint input guiding mode. As such, the In-display Middle Ware returns the control right of the fingerprint input area of the display to the APP, and the APP further controls the display to restore the originally normally displayed image and the touch detection operation events of the display are thus normally responded by the APP. Alternatively, the exit of the fingerprint input guiding mode may also be achieved by virtue of the return key of the smart terminal.

Figure 14:
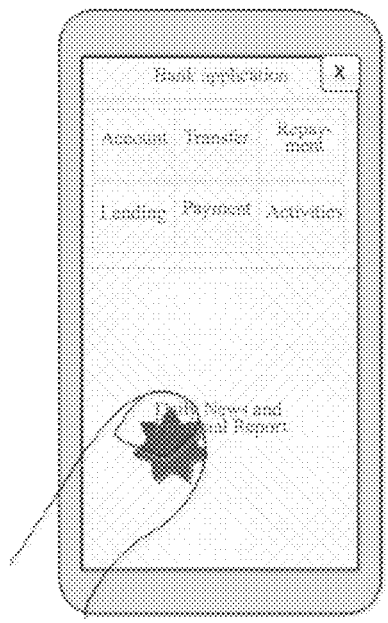
FIG. 14 is a schematic diagram of displaying a fingerprint input guiding icon on the application page shown in FIG. 12 according to another optional implementation of the method for guiding fingerprint recognition of the present application in the screen-on state.

Referring to FIG. 14, as another optional implementation, after the smart terminal enters the fingerprint input guiding mode, the In-display Middle Ware may take over the entire display area of the display including the effective fingerprint detection area and other display areas as shown in FIG. 14 by performing an interactive control with the DP Driver unit. In addition, the In-display Middle Ware may further control the display via the DP Driver unit to display the fingerprint input guiding icon within the effective fingerprint detection area. On the other hand, the In-display Middle Ware may also control the display content of areas other than the effective fingerprint detection area of the display to be hidden or weakened via the DP Driver unit. For example, in the embodiment shown in FIG. 14, the In-display Middle Ware may control the DP Driver unit to add a fingerprint input guiding layer on the APP-related display image layer, and the fingerprint input guiding icon is displayed in an area of the fingerprint input guiding layer corresponding to the effective fingerprint detection area.

In addition, the In-display Middle Ware can also drive the touch module via the TP Driver unit to maintain the touch detection function in the effective fingerprint detection area, but pause the touch detection function in other areas, thereby realizing that in the fingerprint input guiding mode, except the effective fingerprint detection area, no touch detection operation in other areas would be responded by the display. Similar to the embodiment shown in FIG. 13, in the fingerprint input guiding mode, during the period when taking over the entire display, the In-display Middle Ware may also display an exit button (e.g. the "X" symbol shown in FIG. 14) in a preset location (e.g. corners or other edge areas) in the display via the DP Driver unit, so that the user may press the button to exit the fingerprint input guiding mode and return the control right of the display back to the APP. Alternatively, the exit of the fingerprint input guiding mode may also be achieved by virtue of the return key of the smart terminal.

Figure 15:
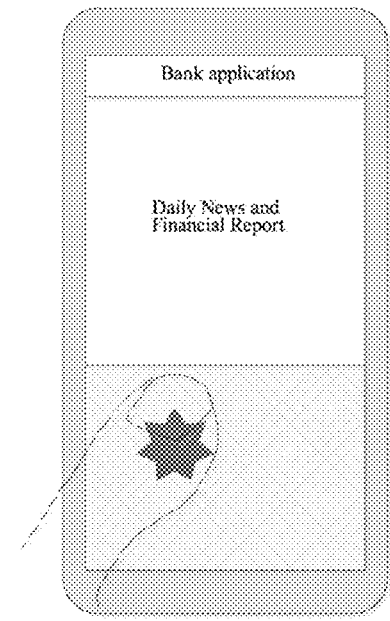
FIG. 15 is a schematic diagram of displaying a fingerprint input guiding icon on the application page shown in FIG. 12 according to a further optional implementation of the method for guiding fingerprint recognition of the present application in the screen-on state.

Referring to FIG. 15, as yet another optional implementation, after the smart terminal enters the fingerprint input guiding mode, the In-display Middle Ware divides the display of the smart terminal into two areas. One of the areas is configured as a normal display area and the other area is configured as a fingerprint input area corresponding to the effective fingerprint input area. The area division of the display is similar to the implementation shown in FIG. 13. And the In-display Middle Ware may further take over the fingerprint input area, and drive the display via the DP drive unit to display the fingerprint input guiding icon in the fingerprint input area.

However, unlike the implementation shown in FIG. 13, in this embodiment, the fingerprint input area and the normal display area are both located in the same active layer, in order to display the fingerprint guiding icon in the fingerprint input area, the In-display Middle Ware may control the display module to translate the originally normally displayed image out of the fingerprint input area towards a preset direction for the displaying of the fingerprint guiding icon. As shown in FIG. 12, before entering the fingerprint input guiding mode, the banking APP respectively controls the upper half and the lower half of the display to display operation buttons and information contents ("Daily News and Financial Reports") on related APP pages; after entering the fingerprint input guiding mode, as shown in FIG. 15, the In-display Middle Ware controls the display to translate the related APP pages upward, and the information contents ("Daily News and Financial Report") are pushed to be displayed on the upper half of the display, and the operation buttons originally displayed in the upper half of the display are hidden accordingly, as such, the content displayed on the lower half of the same layer (i.e., the display area where the effective fingerprint detection area is located) is cleared for the displaying of the fingerprint guiding icon.

Optionally, in the implementation shown in FIG. 15, the normal display area may still maintain its normal display state, and respond to the touch input operation of the user normally. For example, after the smart terminal enters the fingerprint input guiding mode, if the user performs a touch operation in the normal display area, the touch module can still normally detect the touch operation in the normal display area and respond to the touch operation. More specifically, in order to respond to the touch operation in the normal display area normally, when the touch operation is detected and reported by the touch module, the In-display Middle Ware may control the smart terminal to exit the fingerprint input guiding mode, and display the content corresponding to the touch operation on the display.

On the other hand, similar to the embodiments shown in FIG. 13 and FIG. 14, in the fingerprint input guiding mode, the In-display Middle Ware may also control the display to display an exit button (not shown in FIG. 0.5) at a preset location (e.g., corners or other edge areas of the fingerprint input area), and in response to the user's operation on the exit button or the return key of the smart terminal, the In-display Middle Ware may exit the fingerprint input guiding mode and return the control right of the display to the APP.

Step 340: whether there is a finger touch in the effective fingerprint detection area of the display is detected, if so, perform step 350; otherwise, continue to perform step 340;

Specifically, according to the fingerprint input guiding icon displayed on the display, the user can perform a fingerprint input operation in the effective fingerprint detection area of the display with his/her finger, as shown in FIGS. 13 to 15. Therefore, in step 340, the touch module may detect whether there exists a finger touch in the effective fingerprint detection area of the display, and the touch module may report the detection result to the In-display Middle Ware though the TP Driver unit of the OS when detecting that there exists a finger touch in the effective fingerprint detection area of the display.

Step 350: the In-display Middle Ware wakes up the fingerprint recognition module to initiate the fingerprint collection function.

In step 350, when the In-display Middle Ware learns that there exists a finger touching the effective fingerprint detection area of the display from the detection result reported by the touch module, it may perform an interactive control with the FP Driver unit of the OS, and wake up the fingerprint recognition module via the FP Driver unit, thereby initiating the fingerprint collection function of the smart terminal.

Step 360: fingerprint information is collected by the fingerprint recognition module, and the fingerprint information is uploaded to the In-display Middle Ware.

Specifically, after being waken up, the fingerprint recognition module may collect the fingerprint information of the finger that is performing a pressing-type fingerprint input operation within the effective fingerprint detection area of the display, and upload the fingerprint information to the In-display Middle Ware via the FP Drive unit of the OS.

Step 370: fingerprint recognition verification is performed according to the fingerprint information, and the fingerprint verification result is returned to the APP.

Specifically, the In-display Middle Ware may perform the fingerprint recognition verification according to the fingerprint information reported by the fingerprint recognition module. If the fingerprint recognition verification is passed, the user currently performing the fingerprint input operation is determined to be an authorized user, who has the authority to carry out the corresponding function of the APP (such as a mobile payment function); otherwise, if the fingerprint recognition verification fails, then the user currently performing the fingerprint input operation is determined to be an unauthorized user and thus does not have the authority to perform the corresponding function of the APP. Further, the In-display Middle Ware may return the verification result of the fingerprint recognition verification to the APP via the OS, and the APP may perform corresponding processing according to the fingerprint recognition verification result.

In step 370, after the fingerprint recognition verification operation is completed, the In-display Middle Ware may control the smart terminal to exit the fingerprint input guiding mode, and return the control right of the display to the APP. And then the APP controls the display to display an image corresponding to the fingerprint verification result.

Based on the method for guiding fingerprint recognition according to the above-mentioned embodiments, an embodiment of the present application further provides a device for guiding fingerprint recognition. Regarding the schematic structure diagram of the device for guiding fingerprint recognition, please refer to FIG. 2, the specific functions of each functional module and the way in which these functional modules interact with each other to implement the process for guiding the In-display fingerprint recognition may refer to the description of the method for guiding fingerprint recognition described above.

It should be understood that the method and device for guiding fingerprint recognition according to the embodiments of the present application can also be applied to a smart terminal device with a full-screen fingerprint recognition function, in this case, the user experience of the In-display fingerprint recognition operation can also be improved though the fingerprint input guiding icon.

Via the description of the above embodiments, it can be clearly understood by those skilled in the art that each embodiment can be implemented by means of software plus a necessary universal hardware platform, and of course, it can also be implemented via hardware. Based on this understanding, the above-mentioned technical solutions that are in essence, or partly contribute to the prior art can be embodied in the form of a software product. The computer software product can be stored in a computer-readable storage medium, such as a ROM/RAM, a magnetic device, an optical disc, etc., and include instructions for causing a computer device which may be a personal computer, a server or a network device to perform the various embodiments or some methods described in the embodiments.

The above embodiments are preferred embodiments of the present application, but the implementation of the present application is not limited by the above embodiments, and any other changes, modifications, substitutions, combinations, and simplification made without departing from the spirit and principle of the present application should all be equivalent replacement methods, which are all included in the protection scope of the present application.

What is claimed is:

1. A method for guiding fingerprint recognition, comprising:
   determining a current working state of a smart terminal, wherein the current working state of the smart terminal comprises a screen-off state, a screen-locked state, or a screen-on state;
   determining whether a fingerprint input prompting is needed according to the current working state of the smart terminal;
   in response to determining that the fingerprint input prompting is needed, displaying a fingerprint input guiding icon within an effective fingerprint detection area of a display, wherein the effective fingerprint detection area is an area in which a fingerprint sensor is capable of detecting a fingerprint input in a normal way;
   initiating a fingerprint collection function, and collecting fingerprint information within the effective fingerprint detection area;
   wherein the determining whether the fingerprint input prompting is needed according to the current working state comprises:
   when the smart terminal is currently working in the screen-off state or the screen-locked state, it is determined that the fingerprint input prompting is needed;
   when the smart terminal is currently working in the screen-on state, determining whether there exists a fingerprint verification request initiated by an application to the operating system, if there exists the fingerprint verification request, it is determined that the fingerprint input prompting is needed.

2. The method for guiding fingerprint recognition according to claim 1, wherein an In-display Middle Ware is provided inside an operating system of the smart terminal, wherein the displaying the fingerprint input guiding icon within the effective fingerprint detection area of the display comprises:
   performing, by the In-display Middle Ware, an interactive control with a display driver unit, and driving the display via the display driver unit to display the fingerprint input guiding icon within the effective fingerprint detection area.

3. The method for guiding fingerprint recognition according to claim 2, wherein before the smart terminal enters a fingerprint input guiding mode and displays the fingerprint input guiding icon, a fingerprint recognition module of the smart terminal is in a sleep mode.

4. The method for guiding fingerprint recognition according to claim 3, further comprising:
   detecting whether there exists a finger touch operation within the effective fingerprint detection area of the display via a touch module;
   if there exists the finger touch operation, waking up, by the In-display Middle Ware, the fingerprint recognition module to initiate a fingerprint collection function.

5. The method for guiding fingerprint recognition according to claim 1, wherein the operating system of the smart terminal is provided with an In-display Middle Ware, wherein the when the smart terminal is currently working in the screen-on state, displaying the fingerprint input guiding icon within the effective fingerprint detection area of the display comprises:
   controlling, by the In-display Middle Ware, the smart terminal to enter a fingerprint input guiding mode, and performing an interactive control with the display driver unit to take over at least a part of the display, wherein the part of the display covers the effective fingerprint detection area of the display;
   driving, by the In-display Middle Ware, the display via the display driver unit to display the fingerprint input guiding icon in the effective fingerprint detection area.

6. The method for guiding fingerprint recognition according to claim 5, wherein after the In-display Middle Ware enters the fingerprint input guiding mode, dividing the display into a normal display area and a fingerprint input area, wherein the fingerprint input area is an area which is corresponding to the effective fingerprint input area and is taken over by the In-display Middle Ware, and the normal display area is an area other than the fingerprint input area;
   wherein after entering the fingerprint input guiding mode, an image content originally displayed in the normal display area of the display is maintained, and an image content originally displayed in the fingerprint input area of the display is hidden or weakened to display the fingerprint input guiding icon; or, an image content originally displayed in the fingerprint input area of the display is translated to the normal display area to display the fingerprint input guiding icon, and an image content originally displayed in the normal display area is at least partially hidden accordingly.

7. The method for guiding fingerprint recognition according to claim 5, further comprising:
   after entering the fingerprint input guiding mode, taking over, by the In-display Middle Ware, a display area of the entire display, and weakening or hiding an image content originally displayed on the display to display the fingerprint input guiding icon.

8. The method for guiding fingerprint recognition according to claim 5, further comprising:
   in the fingerprint input guiding mode, driving, by the In-display Middle Ware, the display via the display driver unit to display an exit button, wherein the exit button is used to provide a user with an operation button to manually control the smart terminal to exit the fingerprint input guiding mode;
   when it is detected that the user performs an exit operation via the exit button or a return key of the smart terminal, returning, by the In-display Middle Ware, a state indicating a cancellation of a fingerprint verification request, and controlling the smart terminal to exit the fingerprint input guiding mode at the same time, and returning a control right of the display back to the application.

9. A device for guiding fingerprint recognition, comprising an In-display Middle Ware, a display and a fingerprint recognition module, the In-display Middle Ware is provided in an operating system of a smart terminal, wherein:
   the In-display Middle Ware is configured to determine a current working state of the smart terminal, determine whether a fingerprint input prompting is needed according to the current working state of the smart terminal, control the display to display a fingerprint input guiding icon in an effective fingerprint detection area in response to determining that the fingerprint input prompt is needed, and initiate a fingerprint collection function of the fingerprint recognition module; the fingerprint recognition module is configured to collect fingerprint information within the effective fingerprint detection area after the fingerprint collection function is initiated, wherein the effective fingerprint detection area is an area in which a fingerprint sensor is capable of detecting a fingerprint input in a normal way;
   wherein the current working state of the smart terminal comprises a screen-off state, a screen-locked state, or a screen-on state; wherein the In-display Middle Ware determines that a fingerprint input prompting is needed when the smart terminal is currently working in the screen-off state or the screen-locked state; and when the smart terminal is currently working in a screen-on state, further determines whether there exists a fingerprint verification request initiated by an application to the operating system, if there exists the fingerprint verification request, the In-display Middle Ware determines that the fingerprint input prompting is needed.

10. The device for guiding fingerprint recognition according to claim 9, further comprising a touch module, and before the smart terminal enters the fingerprint input guiding mode, the fingerprint recognition module of the smart terminal is in a sleep mode.

11. The device for guiding fingerprint recognition according to claim 10, wherein the touch module is configured to detect whether there exists a finger touch operation within the effective fingerprint detection area after entering the fingerprint input guiding mode; and the In-display Middle Ware is further configured to wake up the fingerprint recognition module to initiate a fingerprint collection function when the touch module detects the finger touch operation.

12. The device for guiding fingerprint recognition according to claim 10, wherein when the smart terminal is currently working in the screen-on state, the In-display Middle Ware is further configured to take over at least a part of the display after the smart terminal enters the fingerprint input guiding mode, wherein the part of the display covers the effective fingerprint detection area of the display.

13. The device for guiding fingerprint recognition according to claim 12, wherein the In-display Middle Ware is further configured to divide the display into a normal display area and a fingerprint input area after entering the fingerprint input guiding mode, wherein the fingerprint input area is an area which is corresponding to the effective fingerprint input area and is taken over by the In-display Middle Ware, and the normal display area is an area other than the fingerprint input area.

14. The device for guiding fingerprint recognition according to claim 13, wherein after entering the fingerprint input guiding mode, an image content originally displayed in the normal display area of the display is maintained, and an image content originally displayed in the fingerprint input area is hidden or weakened to display the fingerprint input guiding icon.

15. The device for guiding fingerprint recognition according to claim 13, wherein after entering the fingerprint input guiding mode, an image content originally displayed in the fingerprint input area of the display is translated to the normal display area to display the fingerprint input guiding icon, and an image content originally displayed in the normal display area is at least partially hidden accordingly.

16. The device for guiding fingerprint recognition according to claim 12, wherein after entering the fingerprint input guiding mode, the In-display Middle Ware takes over a display area of the entire display, and weakens or hides an image content originally displayed on the display to display the fingerprint input guiding icon.

17. The device for guiding fingerprint recognition according to claim 12, wherein the In-display Middle Ware is further configured to drive the display via the display driver unit to display an exit button, wherein the exit button is configured to provide a user with an operation button to manually control the smart terminal to exit the fingerprint input guiding mode;

wherein the In-display Middle Ware is further configured to, when it is detected that the user performs an exit operation via the exit button or a return key of the smart terminal, return a state indicating a cancellation of a fingerprint verification request, and control the smart terminal to exit the fingerprint input guiding mode at the same time, and return a control right of the display back to the application.

18. A smart terminal with an In-display fingerprint recognition function, comprising a processor configured for implementing a method for guiding fingerprint recognition, wherein the method comprises:

determining a current working state of a smart terminal;

determining whether a fingerprint input prompting is needed according to the current working state of the smart terminal;

in response to determining that the fingerprint input prompting is needed, displaying a fingerprint input guiding icon within an effective fingerprint detection area of a display, wherein the effective fingerprint detection area is an area in which a fingerprint sensor is capable of detecting a fingerprint input in a normal way;

initiating a fingerprint collection function, and collecting fingerprint information within the effective fingerprint detection area;

wherein the current working state of the smart terminal comprises a screen-off state, a screen-locked state, or a screen-on state; wherein the determining whether the fingerprint input prompting is needed according to the current working state comprises:

when the smart terminal is currently working in the screen-off state or the screen-locked state, it is determined that the fingerprint input prompting is needed;

when the smart terminal is currently working in the screen-on state, determining whether there exists a fingerprint verification request initiated by an application to the operating system, if there exists the fingerprint verification request, it is determined that the fingerprint input prompting is needed.

* * * * *